(12) United States Patent
Willisch et al.

(10) Patent No.: US 7,291,937 B2
(45) Date of Patent: Nov. 6, 2007

(54) OPERATING METHOD FOR A WIND TURBINE WITH A SUPERSYNCHRONOUS CASCADE

(75) Inventors: Wolf Willisch, Hamburg (DE); Robert Müller, Lübeck (DE)

(73) Assignee: DeWind GmbH, Lübeck (DE)

( * ) Notice: Subject to any disclaimer, the term of this patent is extended or adjusted under 35 U.S.C. 154(b) by 51 days.

(21) Appl. No.: 10/527,205

(22) PCT Filed: Sep. 10, 2002

(86) PCT No.: PCT/EP02/10116

§ 371 (c)(1),
(2), (4) Date: Oct. 25, 2005

(87) PCT Pub. No.: WO2004/025823

PCT Pub. Date: Mar. 25, 2004

(65) Prior Publication Data

US 2006/0113800 A1    Jun. 1, 2006

(51) Int. Cl.
*H02P 9/00* (2006.01)
(52) U.S. Cl. ............................. 290/44; 290/55; 322/29
(58) Field of Classification Search ................. 290/43, 290/44, 54, 55; 322/29, 37
See application file for complete search history.

(56) References Cited

U.S. PATENT DOCUMENTS

| | | | | |
|---|---|---|---|---|
| 4,461,957 A | * | 7/1984 | Jallen | 290/44 |
| 4,906,060 A | * | 3/1990 | Claude | 322/29 |
| 5,225,712 A | * | 7/1993 | Erdman | 290/44 |
| 5,798,631 A | * | 8/1998 | Spee et al. | 322/25 |
| 6,137,187 A | | 10/2000 | Mikhail et al. | |
| 6,420,795 B1 | * | 7/2002 | Mikhail et al. | 290/44 |
| 6,566,764 B2 | * | 5/2003 | Rebsdorf et al. | 290/44 |
| 6,784,564 B1 | * | 8/2004 | Wobben | 290/44 |
| 6,856,038 B2 | * | 2/2005 | Rebsdorf et al. | 290/44 |
| 6,965,174 B2 | * | 11/2005 | Wobben | 290/44 |
| 7,095,128 B2 | * | 8/2006 | Canini et al. | 290/44 |

FOREIGN PATENT DOCUMENTS

| | | |
|---|---|---|
| DE | 197 35 742 | 2/1999 |
| DE | 198 45 569 | 4/1999 |
| DE | 101 17 212 | 10/2002 |
| WO | WO 03 026 121 | 3/2003 |

\* cited by examiner

*Primary Examiner*—Nicholas Ponomarenko
(74) *Attorney, Agent, or Firm*—Collard & Roe, P.C.

(57) ABSTRACT

The invention relates to a wind energy system having a rotor that can be driven by the wind, preferably having one or more rotor blades that can be adjusted in angle, a generator directly or indirectly connected with the rotor, to generate electric energy, which is configured as an asynchronous generator having a super-synchronous converter cascade in the rotor circuit, for slip-variable generator operation, so that power output of the generator is possible at variable speeds of rotation of the rotor, and an operation guide system that is configured to regulate the speed of rotation of the rotor, within a predetermined wind speed range. To improve the energy yield, it is provided that the super-synchronous rectifier cascade is configured in the rotor circuit for feeding the slip power into the network. For this purpose, the super-synchronous converter cascade has a DC voltage intermediate circuit having a high-set element. These are configured to switch, as IGBT switches, with a 180 degree phase shift relative to the rotor voltage.

Furthermore, the invention relates to a method for regulating the power output of the wind energy system, in that the slip is regulated, whereby the slip power is fed into the network.

11 Claims, 3 Drawing Sheets

OPERATING METHOD FOR A WIND TURBINE WITH A SUPERSYNCHRONOUS CASCADE

CROSS REFERENCE TO RELATED APPLICATIONS

Applicants claim priority under 35 U.S.C. 365 of PCT/EP2002/010116 filed on Sep. 10, 2002. The international application under PCT article 21(2) was not published in English.

BACKGROUND OF THE INVENTION

1. Field of the Invention

The invention relates to a wind energy system having a rotor that can be driven by the wind, preferably having one or more rotor blades that can be adjusted in angle, a generator directly or indirectly connected with the rotor, to generate electric energy, which is configured as an asynchronous generator having a super-synchronous converter cascade in the rotor circuit, for slip-variable generator operation ,so that power output of the generator is possible at different speeds of rotation of the rotor, and an operation guide system that is configured to regulate the speed of rotation of the rotor, within a predetermined wind speed range, preferably with adjustment of the rotor blade angles.

Furthermore, the invention relates to a method for regulating the power output of a wind energy system, in that the slip is regulated.

2. The Prior Art

A system of this type is known from the older application of the applicant, DE 10117212.5.

Such wind energy systems, which work at a variable speed of rotation of the rotor and variable rotor blade angles, produce more electric energy than systems that work at a single, fixed speed of rotation of the rotor and fixed, predetermined rotor blade angles. Usually, work at a variable speed of rotation takes place in the range of very low wind speeds, whereby the rotor blades assume a large angle relative to the incident wind, which is only slightly less than 90 degrees. This rotor blade angle is not changed, at first, with an increasing wind speed, until the wind speed is sufficient to turn the rotor at the rated speed of rotation, whereby the wind energy system puts out its rated output. The power output therefore increases, proceeding from a very small output at a minimum wind speed, along with the speed of rotation of the rotor, until the rated power is reached. If the wind speed increases further, the rated power and the rated speed of rotation are now kept constant, as much as possible, until the wind speed increases above a shut-off speed. Here, the wind energy system is shut off, in that the rotor blades are turned completely in the wind direction, so that the rotor blade angles relative to the wind direction amount to approximately zero degrees. In this way, the rotor is braked. Shut-off at very high wind speeds is necessary because the stress on the wind energy system in operation under very strong winds, particularly gusts, can become so great that damage can occur.

With an increasing power and number of such wind energy systems, equalization of short-term power variations in the utilities poses greater and greater difficulties. For this reason, the demands on the quality of the current that is supplied are constantly increasing.

For this purpose, suitable controls for asynchronous generators have been developed. Such an asynchronous generator achieves a variable slip of up to 10%, which means that the rotor and the generator permit a variation of 10% in the speed of rotation during gusts, by means of suitable computer control. In the case of strong winds, the generator constantly holds the electricity generation at the rated power. The elasticity in the system minimizes the stress on the vital components of the wind energy system, and improves the quality of the current that is being fed into the power network.

In the case of this known method of operation of the wind power system having a rotary current generator, the adaptation of the speed of rotation for uniform supply to the network in the case of gusty winds is implemented by means of a changeable slip, with a pulse-controlled resistor in the rotor circuit. The rotor slip power remains unused and is converted into heat.

Another known concept is the super-synchronous cascade for an asynchronous generator having slip rings. In this connection, the rectified slip power is fed into the network by way of a network-guided inverter. Disadvantages in this application are strong pendulum moments of the current oscillations that are produced in the generator, a great need for reactive power, and possible commutation failure of the inverter.

Another method of a cascade, known from U.S. Pat. No. 6,137,187, is regulation of the rotor currents with a voltage intermediate circuit converter, according to a field-oriented method for a dual-fed rotary current generator, for utilization of a supra-synchronous and a super-synchronous range of the speed of rotation. The field-oriented regulation methods of the dual-fed asynchronous generator are problematic in the case of short voltage collapses in the network, and in case of network short-circuit.

SUMMARY OF THE INVENTION

It is the task of the invention to propose a wind energy system that makes available a better quality of the current that is supplied, as well as a method for the operation of such a system. The method for operation of the wind power system is supposed to work in robust and cost-effective manner and, in particular, to be able to be used in networks that are susceptible to breakdowns. In particular, it is another task of the invention to indicate a method that allows efficient production of electric energy even with weak winds.

The device task is accomplished, in the case of a system of the type stated, in that the super-synchronous rectifier cascade is configured in the rotor circuit for feeding the slip power into the network. The slip power is therefore fed into the network, according to the invention. The operation of the wind power system becomes more efficient as a result.

This is advantageously achieved in that the super-synchronous rectifier cascade has a DC voltage intermediate circuit that is configured as a high-set element.

In this connection, it is advantageously provided that the high-set element is configured to switch at a frequency that is a multiple of the network frequency, preferably in the range between a 10× multiple to a 100× multiple.

The high-set element can have pulse-width modulation or be configured of IGBT switches having a variable frequency. A pulse-width modulation of the IGBT switches that is controlled as a function of the rotor currents, rotor frequency, or rotor voltages controls an intermediate circuit voltage for the network-side pulse converter, which intermediate circuit voltage is adapted to the network voltage.

To prevent current harmonics of the rotor currents, it is advantageous if the IGBT switches are cycled, advantageously at a variable high switching frequency and a 180 degree phase shift, in order to make up for the slip-dependent ripple of the rectified rotor voltage.

It is advantageously provided that the stator is configured to short-circuit at a low wind speed limit, preferably by way of a three-phase slip resistor, and to cut itself off from the network. The generator can then still supply power to the network even at low wind speeds, as a simple asynchronous generator.

In the case of a method of the type stated, the task is accomplished in that the slip power is fed into the network.

In this connection, the rotor voltage of the generator, which is dependent on the speed of rotation and has been rectified, is raised to the level of the network voltage with the high-set elements.

An advantageous embodiment of the method is if the power output of the rectifier cascade into the network is controlled by means of pulse-width modulation.

An advantageous contribution to the quality of the network can be made if the feed of the intermediate circuit power into the network is adapted to the reactive power demand of the network.

It is advantageously provided that switching of the intermediate circuit current by means of the two high-set elements takes place at a 180 degree phase offset relative to one another, preferably pulse-width-modulated and/or with variable frequency, in order to minimize feedback effects of current harmonics on the generator, resulting from the ripple of the rectified, slip-dependent rotor voltage $U_{ZS}$.

The energy yield can advantageously be increased in that the rotary current generator is operated in normal operation at normal wind conditions, with the super-synchronous cascade with the high-set element, and is switched over to a simple asynchronous machine at low wind, by cutting its stator off from the power network and short-circuiting the stator by way of a three-phase slip resistor, and operated as such.

This is particularly true if the asynchronous generator is operated with the capacitors, in self-starting manner, and feeds its electric energy into the intermediate circuit capacitors in frequency-variable manner, as a function of the rotor revolutions, by way of the rectifier and the high-set element, and the pulse converter feeds the generated energy into the power network.

It is particularly advantageous if the generator is synchronized with the stator and connected with the power network, as soon as the mechanical power exceeds the electric power of the pulse converter, and the super-synchronous slip power is fed into the network with the cascade array.

Finally, it is possible to do without special resistors, in that at least one cable of the generator, which is preferably disposed on a gondola, is passed to a wiring cabinet in a foot of the tower, and act as a slip resistor.

BRIEF DESCRIPTION OF THE DRAWINGS

Additional advantages and details of the invention are evident from the following description of an exemplary embodiment, using the drawings. These show.

DETAILED DESCRIPTION OF PREFERRED EMBODIMENTS

Figure 1:
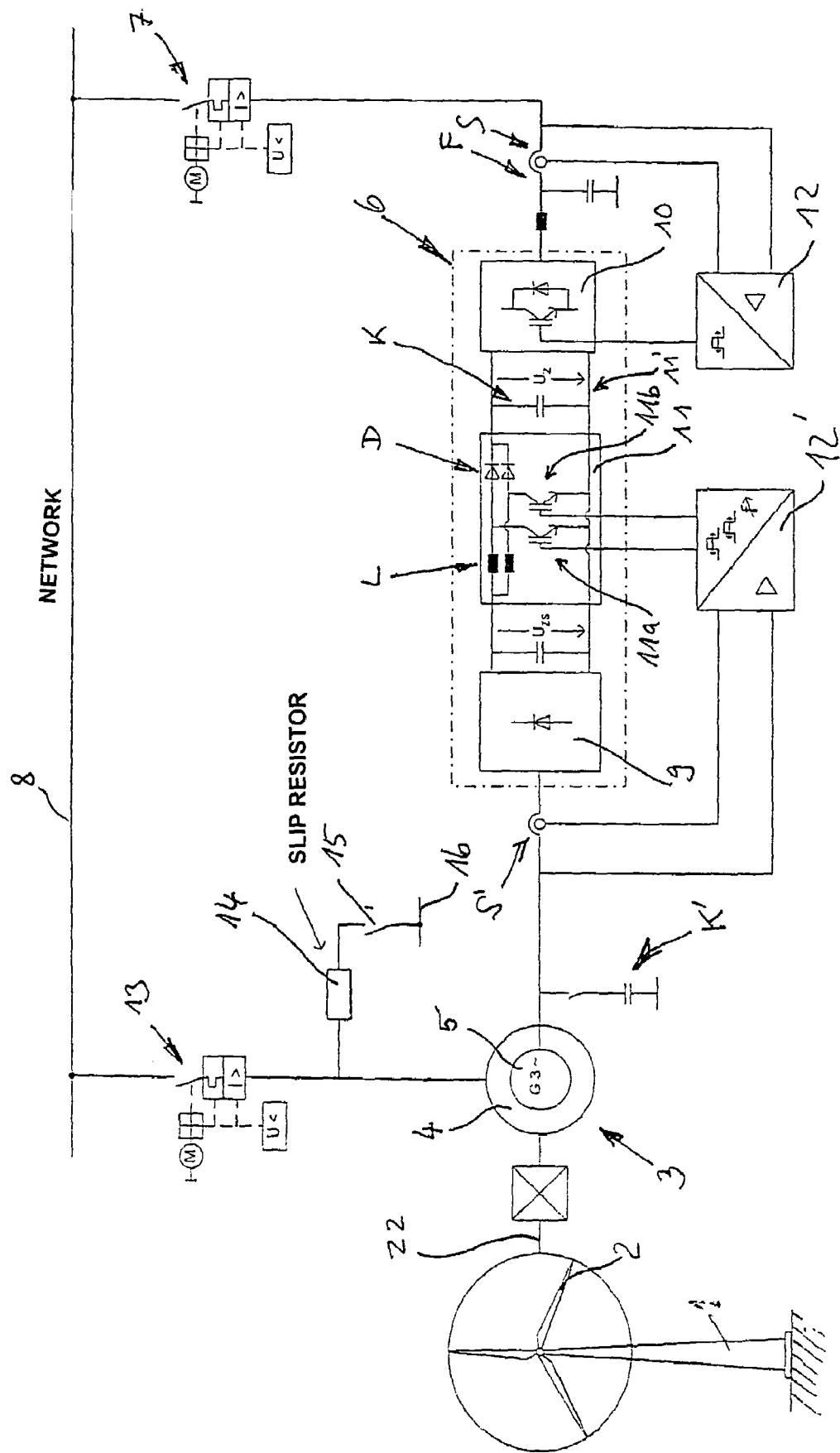
FIG. 1: a schematic representation of a wind energy system according to the invention, which is suitable for implementing the method according to the invention.

The wind energy system according to the invention that is shown has a mast 1 that is anchored in the ground and a rotor 2 having three rotor blades that are mounted at the top of the mast 1. The rotor blade angles are configured to be adjustable relative to their longitudinal axis. The rotor 2 is mechanically connected with an electric asynchronous generator 3, by way of a gear mechanism. The stator 4 of the generator 3 is electrically connected with the network 8. In this connection, the network frequency and the frequency generated in the stator are synchronized with one another. The rotor 5 of the generator 3 is connected with the converter array 6 by way of the lines, which array in turn is connected with the lines between the stator 4 and the network 8. The slip power generated by the generator is fed into the network with the converter array 6. The slip power of the rotor and therefore the speed of rotation are controlled variably. The power to be fed into the network 8 by the generator 3 with low variations is achieved by an operation guide system that is not shown but is familiar to a person skilled in the art, which regulates the speed of rotation of the rotor and the rotor blade angle. The stator 4 of the rotary current generator 3 can be electrically connected either with the power network 8, by way of a first switch 13 or, alternatively, with a short-circuited coil, by way of a three-phase slip resistor 14 and a second switch 15. In the present wiring diagram, this stator short-circuit is provided with the reference symbol 16.

The rotor 5 is electrically connected with a converter 6, which in turn can be connected with or cut off from the power network 8 by way of a third switch 7.

The converter 6 consists of a rectifier 9, the pulse inverter 10, as well as the high-set element 11, which are electrically connected with one another by way of a DC voltage intermediate circuit 11'. Various operating states of the converter 6 are produced by means of two control devices 12 and 12' for the frequency control and voltage control of both the pulse inverter 10 and the high-set element 11.

According to the invention, the use of the super-synchronous cascade for the rotary current generator 3 of the wind power system is carried out with two high-set elements 11a and 11b (boost converters) in the voltage intermediate circuit 11'. The voltages of the rotor 5 are converted into a slip-dependent DC voltage by way of a three-phase uncontrolled rectifier 9. The smoothed DC voltage $U_{ZS}$ is set high to a voltage $U_Z$ by way of two inductors and two IGBT switches. The IGBT switches 11a and 11b charge the inductors L up to a voltage UL, the diodes D block, in each instance. After a pre-determinable current has been reached, the IGBT switches 11a and 11b are opened and a voltage UZ is forced at the inductor L, with which the intermediate circuit capacitors K are charged. A 6-pulse converter 10 cycles the intermediate circuit energy into the power network, with low harmonics, by way of a network filter F.

To avoid current harmonics of the rotary currents, the IGBT switches 11a and 11b are cycled with a phase shift of 180 degrees, at a variably high switching frequency, in order to make up for the slip-dependent ripple of the rectified rotor voltage $U_{ZS}$. A pulse-width modulation of the IGBT switches that is controlled as a function of the rotor currents, rotor frequency, and rotor voltages, by means of the control device 12', controls an intermediate circuit voltage $U_Z$ for the pulse converter 10 on the network side.

The super-synchronous cascade is therefore configured with two 180 degree phase-shifted high-set elements 11a and 11b in the voltage intermediate circuit 11', which set the rectified rotor voltage to a higher intermediate circuit voltage $U_Z$, which is fed into the power network 8 by way of a pulse converter 10 and by way of a network filter F.

Under normal wind conditions, the rotary current generator 3 is operated in normal operation, with the super-synchronous cascade with the high-set element 11, and at low wind, it is converted to a simple asynchronous machine and operated as such, by means of cutting its stator 4 off from the power network 8 and short-circuiting it by way of a three-phase slip resistor 14.

This asynchronous generator is operated with the capacitors K', in self-starting manner, and feeds its electric energy, by way of the six-pulse uncontrolled rectifier 9 and the subsequent high-set element 11, into the between circuit capacitors K, the pulse converter 10 feeds the generated energy into the power network 8. The control device 12 controls the high-set element 11 under pulse-width control and with variable frequency, in such a manner that ripple of the generator voltage that is dependent on the speed of rotation raises to an intermediate circuit voltage $U_Z$ adapted to the network. The intermediate circuit energy is fed into the network by way of the pulse converter 10, with the control device 12, in sine shape.

In this connection, it is advantageous if the asynchronous generator is operated at low iron losses. Using this method, production of electric energy takes place at a better degree of effectiveness at low wind speeds, as compared with a rotary current generator whose stator 4 is connected with the network 8. If the mechanical power exceeds the electric power of the pulse converter 10, the generator is connected with the power network 8, synchronized with the stator 4, and the super-synchronous slip power is fed into the network with the cascade array.

Figure 2:
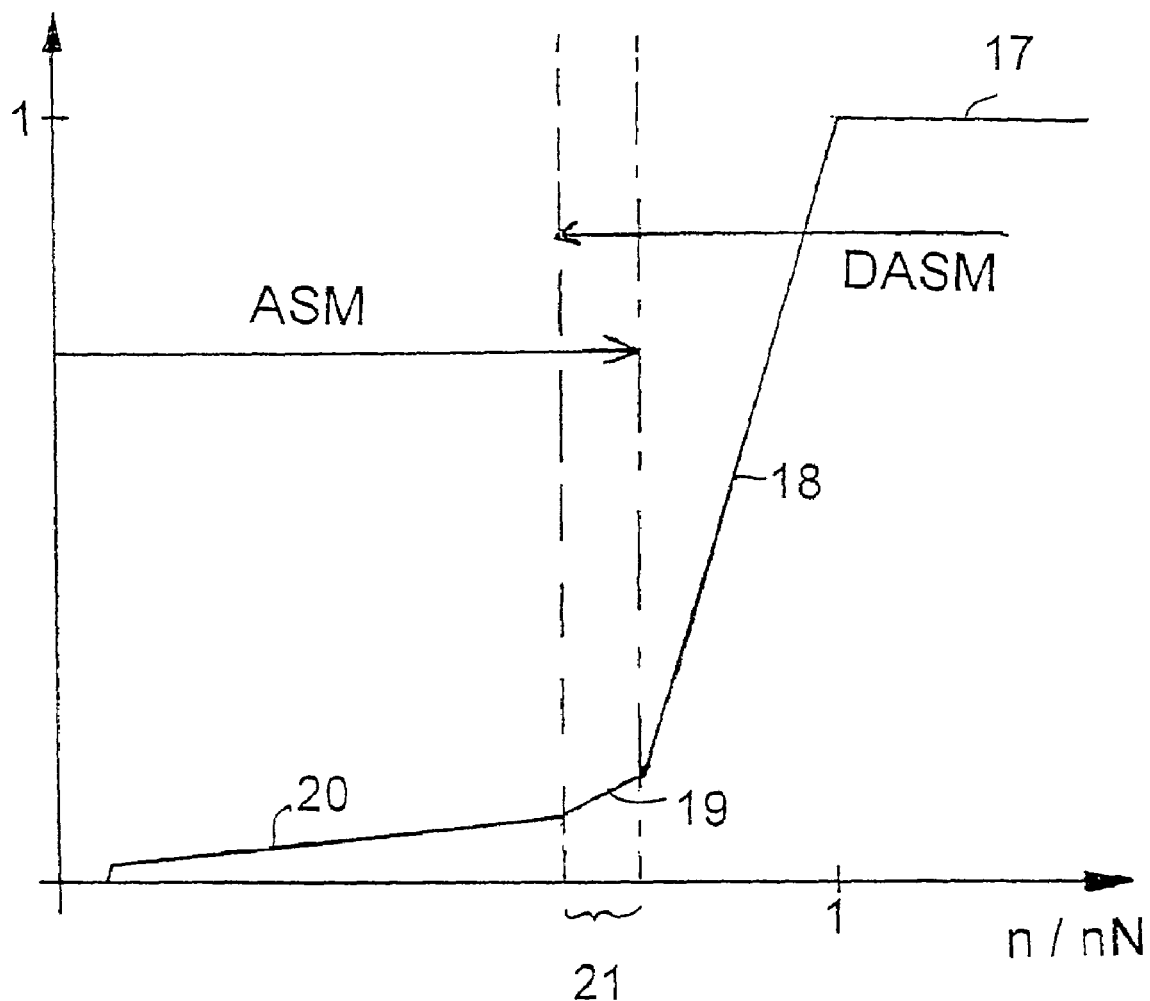
FIG. 2: a diagram showing a standardized representation of the power being produced, as a function of the speed of rotation.

In the diagram of FIG. 2, a speed of rotation n, standardized to a rated speed of rotation nN, is plotted on the abscissa. It makes no difference whether this is the speed of rotation of the propeller 2 or that of the rotor 5, because these two speeds of rotation differ at most by a constant factor, which can be caused by a rigid translation gear mechanism that might be switched in between. However, the constant factor is eliminated by means of the standardization of the scale of the abscissa to the rated speed of rotation.

An electric power P of the rotary current generator 3, standardized to a rated power PN, is plotted on the ordinate of the diagram according to FIG. 2; this is the power that the generator can give off to the power network 8. The power curve of the diagram consists of four segments 17, 18, 19, 20, which can be well differentiated.

If the wind is sufficiently strong, the wind energy system is operated in segment 17. In this connection, the speed of rotation nN required to generate the rated power PN is exceeded. By adjusting the angle of attack of the propeller blades 2, the actual speed of rotation n is adapted to the wind intensity, and in this connection, the power P that is given off to the power network 8 is kept constant at the rated power PN, by means of appropriate control of the converter 6, by means of the control device 12, 12'. The rotary current generator 3 is operated in normal operation in this range, by way of the converter array 6, in super-synchronous cascade operation. The normal operating state is indicated with DASM in FIG. 2.

If the wind becomes weaker, the speed of rotation nN that is required to generate the rated power PN can no longer be maintained. In the range 18 of the power curve, the power P actually given off therefore drops below the rated power PN, specifically approximately proportional to the decreasing speed of rotation n, until a minimal speed of rotation is reached, at which the wind energy system can still be efficiently operated in the normal operating state DASM. If the wind becomes even weaker, a wind energy system would have to be shut down without the operating method according to the invention.

However, the invention permits continued operation of the wind energy system at very weak wind, by means of switching to the operating state ASM, in which the rotary current generator 3 is operated as an asynchronous machine, and the converter 6 is operated as a full converter. In this connection, the stator 4 is cut off from the power network 8 by opening the first switch 13, and short-circuited by way of the slip resistor 14, by closing the second switch 15. This prevents the iron losses of the stator 4 at the power network 8 from outweighing the electric energy simultaneously generated by the generator.

As can be seen in the diagram of FIG. 2, the segment 20 of the power curve again decreases approximately proportional to the speed of rotation, but with a flatter incline as in segment 18. This operating state ASM allows efficient energy feed into the power network 8 when the third switch 7 is closed, even at very low speeds of rotation n, which are achieved at very low wind speeds. In segment 20 of the power curve, the wind energy system being operated according to the invention can therefore produce additional energy, which cannot be produced by a system operated in a conventional manner.

This energy difference, which would be lost in the case of a conventional wind energy system, can become enormous under some circumstances. The amount of the difference is essentially dependent on the wind conditions at the location of the system. The greater the time periods with weak wind conditions, the greater the additional energy gained.

The ranges of speed of rotation of the two operating states ASM and DASM intersect, in FIG. 2, in the switch-over range 21 indicated with a broken line. In this connection, the switch-over point can lie at slightly higher or slightly lower speeds of rotation n, depending on the control algorithm used. The related electric power P can also be different, accordingly. The third segment 19 of the power curve therefore does not represent the actual progression, but is merely to be understood as a schematic representation of the transition.

Figure 3:
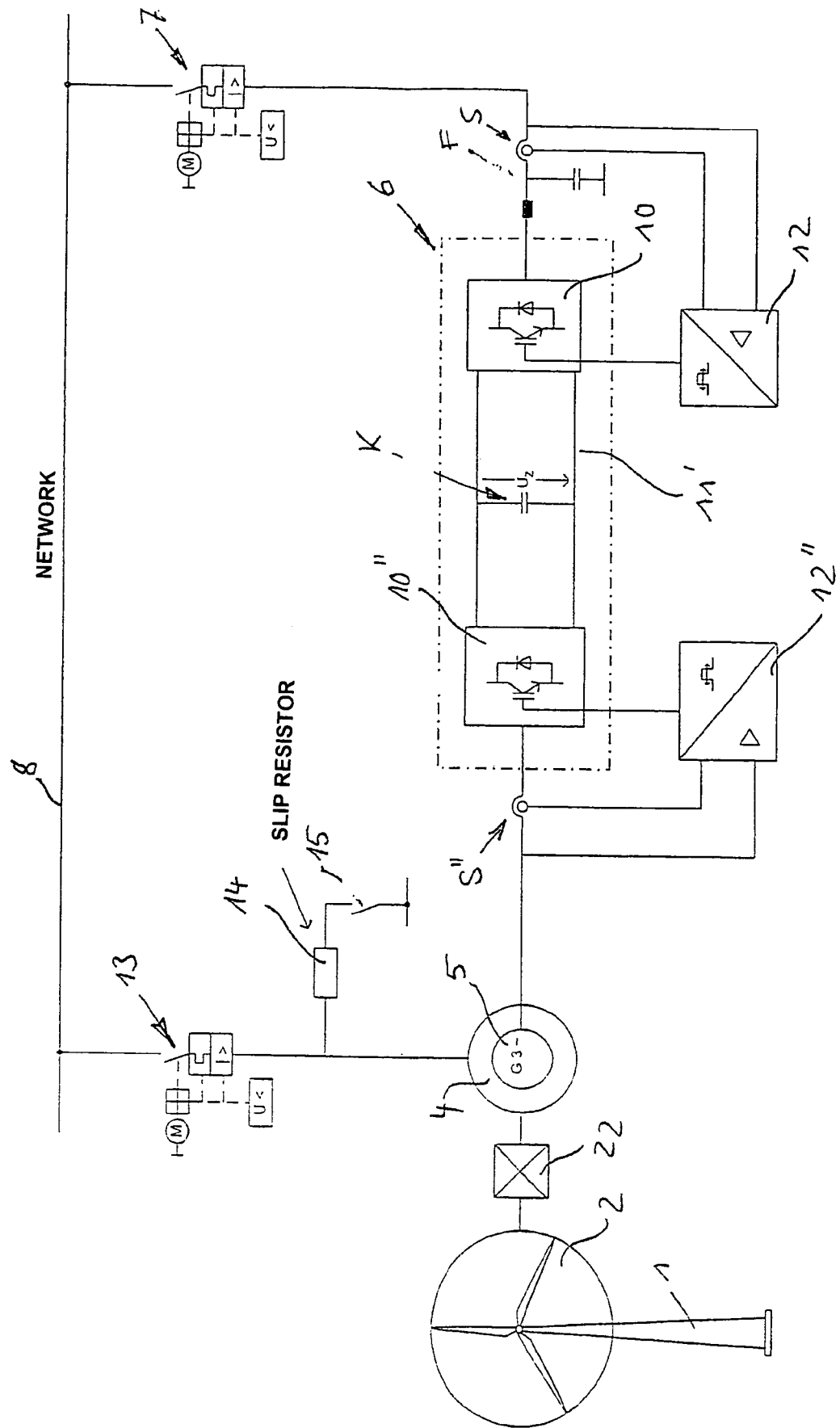
FIG. 3: a schematic representation of a variant, according to the invention, of a wind energy system that is suitable for implementing the method according to the invention.

FIG. 3 shows an alternative embodiment of the wind energy system according to the invention, in which the uncontrolled rectifier 9 in FIG. 1 is replaced with a self-guided pulse converter 10", and no high-set element is present in the intermediate circuit 11'. Here again, like in the case of the rotary current generator 3 having a super-synchronous cascade, the controlled slip power is fed into the power network by way of a self-guided pulse converter 10. To regulate out sine-shaped rotor currents, the pulse converter 10" is provided for feed of the slip power into the DC voltage intermediate circuit, from which the slip power is fed into the power network 8, by means of a second pulse converter 10. The control devices 12" and 12, which are connected with the current sensors S" and S, serve to control the pulse converters 10" and 10.

REFERENCE SYMBOL LIST 1 tower
2 propeller
3 rotary current generator
4 stator
5 rotor
6 converter
7 third switch
8 power network
9 rectifier uncontrolled
10 pulse inverter
10" pulse inverter
11 high-set element
11' DC voltage intermediate circuit
11a high-set element
11b high-set element
12 control device
12' control device
12" control device
13 first switch
14 slip resistor
15 second switch
16 stator short-circuit
L inductance
D diode
K,K' capacitor
F network filter
$U_{ZS}$ DC voltage
$U_Z$ voltage set high
S current sensor
S' current sensor
S" current sensor
17 first segment
18 second segment
19 third segment
20 fourth segment
21 switch-over range
22 mechanical connection
P electric power
PN rated power
n speed of rotation
nN rated speed of rotation
ASM operation as an asynchronous machine/full converter operation
DASM operation as a dual-fed asynchronous machine/normal operation

The invention claimed is:

1. Wind energy system comprising
  a rotor that can be driven by the wind, having one or more rotor blades that can be adjusted in angle,
  a generator connected with the rotor, to generate electric energy, which is configured as an asynchronous generator having a super-synchronous converter cascade in the rotor circuit, for slip-variable generator operation, so that power output of the generator is possible at different speeds of rotation of the rotor, and
  an operation guide system that is configured to regulate the speed of rotation of the rotor, within a predetermined wind speed range,
  wherein the super-synchronous converter cascade is configured in the rotor circuit for feeding the slip power into the network.

2. Wind energy system according to claim 1,
  wherein the super-synchronous converter cascade has a DC voltage intermediate circuit that is configured as a high-set element.

3. Wind energy system according to claim 2,
  wherein the high-set element is configured to switch at a frequency that is a multiple, of the network frequency.

4. Wind energy system according to claim 2,
  wherein the high-set element has pulse-width modulation.

5. Wind energy system according to claim 2,
  wherein the high-set element is configured to switch, with IGBT switches having variable frequency.

6. Wind energy system according to claim 5,
  wherein the IGBT switches of the two high-set elements are configured to switch at a phase offset of 180 degrees relative to one another.

7. Wind energy system according to claim 1,
  wherein the stator is configured to short-circuit at a low wind speed, and to cut off from the network.

8. Wind energy system according to claim 1,
  wherein the generator is connected with the rotor selected from the group consisting of directly connected and indirectly connected.

9. Wind energy system according to claim 1,
  wherein the operation guide system that is configured to regulate the speed of rotation of the rotor, within a predetermined wind speed range, with adjustment of the rotor blade angles.

10. Wind energy system according to claim 3,
  wherein the high-set element is configured to switch at a frequency that is a multiple of 10× to 100× of the network frequency.

11. Wind energy system according to claim 7,
  wherein the stator is configured to short-circuit at a low wind speed by way of a three-phase slip resistor.

* * * * *